United States Patent [19]
Röttger

[11] Patent Number: 5,762,105
[45] Date of Patent: Jun. 9, 1998

[54] VALVES

[75] Inventor: Konstantin Röttger, Blyth, United Kingdom

[73] Assignee: Draeger Limited, Blyth, United Kingdom

[21] Appl. No.: 818,583

[22] Filed: Mar. 14, 1997

[30] Foreign Application Priority Data

Mar. 19, 1996 [GB] United Kingdom ............ 9605759

[51] Int. Cl.$^6$ ............................................ F16L 29/00
[52] U.S. Cl. ............................... 137/613; 251/149.6
[58] Field of Search ........................... 137/613, 614; 251/149.6

[56] References Cited

U.S. PATENT DOCUMENTS

| | | | |
|---|---|---|---|
| 2,188,391 | 1/1940 | Haynes | 137/613 X |
| 2,515,733 | 7/1950 | Quercia et al. | 137/613 X |
| 3,106,937 | 10/1963 | Sands | 137/613 |
| 4,590,967 | 5/1986 | Schmitt et al. | 137/613 |

FOREIGN PATENT DOCUMENTS

| | | |
|---|---|---|
| 598208 | 12/1925 | France. |
| 1032689 | 6/1953 | France. |
| 1132410 | 3/1957 | France. |
| 1298463 | 11/1962 | France. |
| 1629071 | 4/1951 | Germany. |
| 05215299 | 8/1993 | Japan. |
| 689577 | 4/1953 | United Kingdom ............ 137/613 |

Primary Examiner—Kevin Lee
Attorney, Agent, or Firm—Bromberg & Sunstein LLP

[57] ABSTRACT

A valve for controlling the flow of high pressure fluid from an outlet 3 is described. A safety mechanism is provided having a movable valve member 11. When nothing is connected to the outlet the valve member 11 impedes the flow of high pressure fluid to the outlet. When a connector 21 is attached to the outlet 3 the valve member 11 is moved into a position in which the high pressure fluid is free to flow through the outlet into the connector. When the connector is removed the valve member 11 returns to its original position.

15 Claims, 1 Drawing Sheet

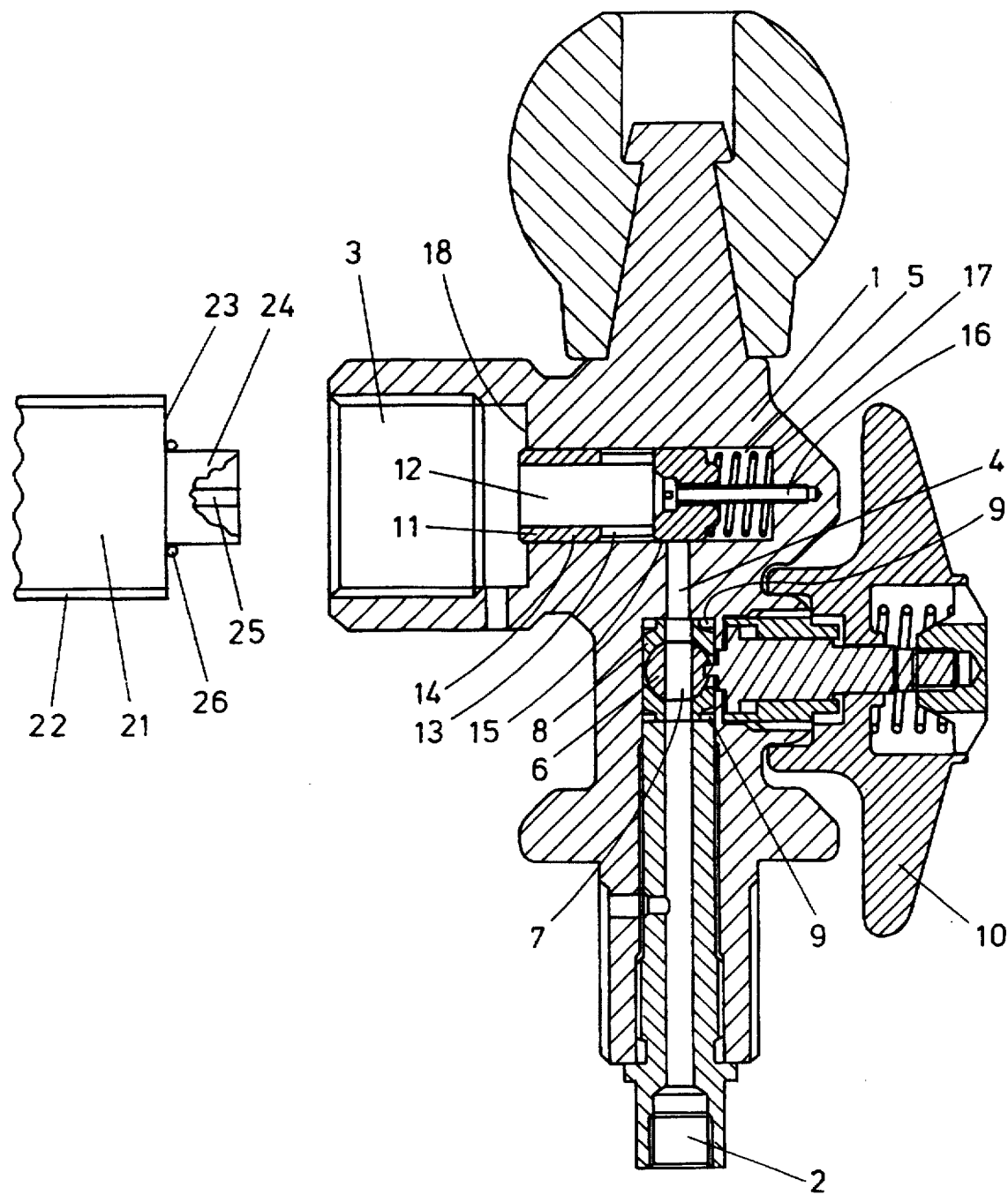

5,762,105

VALVES

IMPROVEMENTS IN OR RELATING TO VALVES

This invention relates to valves and more particularly, but not exclusively, is concerned with a valve for controlling the flow of high pressure fluid from a container.

Generally, when gas or liquid is stored at high pressures in a container provided with a valve to control the flow of the gas or liquid from the container, accidental opening of the valve can lead to a rapid discharge of the contents of the container via the outlet of the valve. This presents a danger to persons in the immediate vicinity due to the high velocity of the fluid flowing from the container to the atmosphere. Also, the reaction forces developed by the discharging fluid may cause the container to be propelled at a sufficient velocity to cause personal injury or other damage.

It is an object of the present invention to provide a valve with a safety mechanism whereby there is a reduced fluid flow from the outlet of the valve if the valve is opened without the outlet being in communication with a connector for conveying fluid from the outlet.

BRIEF SUMMARY OF INVENTION

Accordingly, the present invention provides a valve comprising:

(i) a valve body (ii) an inlet to receive fluid, (iii) an outlet to deliver fluid and adapted to receive a connector for conveying fluid from the outlet, (iv) a path within said valve body to enable fluid to pass from the inlet to the outlet, (v) a first valve member in the path and movable between a first position in which it closes the path and a second position in which the path is open, (vi) a safety mechanism in the form of a second valve member in the path and movable between a first position in which it restricts fluid flow along the path and a second position in which it permits increased fluid flow along the path, (vii) biasing means urging said second valve member into its first position, and (viii) in which the second valve member includes an abutment for engagement by said connector as it is received by said outlet to cause said second valve member to move from its first position in which it restricts fluid flow against the action of the biasing means to its second position.

By means of the present invention, when no connector is connected to said outlet, said second valve member restricts the flow from said inlet to said outlet irrespective of whether or not the first valve member is in its first or second position. Thus, even if the first valve member is in its second position, there will be a reduced fluid flow from the outlet.

BRIEF DESCRIPTION OF DRAWINGS

For a better understanding of the invention and to show how the same may be carried into effect, reference will now be made, by way of example, to the accompanying drawing which shows, in partial section, a valve in accordance with the invention.

DETAILED DESCRIPTION OF INVENTION

Referring to the drawing, the valve comprises a valve body 1 comprising an inlet 2, an outlet 3, and a path to enable fluid to pass from the inlet 2 to the outlet 3. The path comprises a bore 4 defining a first portion of the path and a bore 5 at right angles to bore 4 forming a second portion of the path.

A first valve member in the form of a ball valve is provided at a first location in the first portion of the path. This valve member comprises a generally spherical member 6, including a central bore 7, co-operable with a valve seat 8 sealed with respect to the valve body 1 by means of O-rings 9. The spherical member 6 can be rotated through 90° between a closed first position wherein the central bore 7 is at right angles to the first portion of the path and an open second position (as shown) where the central bore 7 is in registry with the path, by suitably rotating hand wheel 10.

Mounted within the bore 5 defining the second portion of the path, at a second location downstream of the first valve member, is a safety mechanism in the form of a second valve member. This second valve member comprises a cylindrical sleeve 11 axially displaceable along the bore 5 and having first and second ends having end faces 30 and 31. The sleeve 11 includes a tubular portion at the first end defining a bore 12 in communication with an aperture 13 in the cylindrical wall 14 of the sleeve. The cylindrical wall 14 is of a dimension such that there is a small diametrical clearance 15 between its outer surface and the adjacent surface of the body defining bore 5. The second end of the sleeve 11 includes a further bore whereby the sleeve is mounted on a spigot 16 secured to the body 1. The sleeve is axially displaceable along the spigot 16, between a first position where the aperture 13 is out of registry with the bore 4 defining the first portion of the path and a second position where the aperture 13 is in registry with the bore 4. A spring 17 is provided between the second end face 31 and the body to bias the sleeve 11 towards its first position.

The inlet 2 includes an internal screw thread whereby it may be threadingly engaged with the outlet of a container (not shown) containing, for example, air at high pressure. The outlet 3 similarly includes an internal screw thread whereby it can be threadingly engaged with a connector 21 having a corresponding external screw thread 22. The connector 21 includes, at its end face 23, a projection 24 having an internal bore 25. An O-ring 26 is provided on the end face 23 around the projection 24. As the connector 21 is screwed into the outlet 13, the O-ring 26 abuts against bottom face 18 of the outlet 3 to form a leak tight connection. However, the projection 24 of the connector 21 engages with the first end face 30 of the sleeve 11 and urges the sleeve 11, against the force of the spring 17, from its first position as shown to its second position where the aperture 13 is in registry with the first portion of the path. When the connector 21 is removed from the outlet 3, the sleeve 11 returns to its first position under the influence of the spring 17.

In use, high pressure air flows from the container into the inlet 2 and along the first portion of the path. In the event that connector 21 is connected to the outlet 3, the air can flow along the first portion of the path 4 when the ball valve is in its open second position and enter the second portion of the path via aperture 13 and bore 12 (since the presence of the connector 21 in the outlet 3 causes the sleeve 11 to adopt its second position where the aperture 13 is in registry with the bore 4 and hence an increased flow of air can pass). Thus, a full flow of air can readily pass from the container, along the valve path to the connector 21, and thence to the equipment (not shown) attached thereto. When the ball valve is caused to adopt its closed first position then the air flow is stopped.

In the absence of connector 21, the sleeve 11 adopts its first position where the aperture 13 is not in registry with the first portion of the path but where there is small clearance 15 between the cylindrical wall 14 and the adjacent wall of the valve body 1. In this case, if the ball valve were to be moved to its open second position, air can flow along the first portion of the path (bore 4) but its flow into the second portion of the path (bore 5) is restricted since it can pass into the bore 5 only via the small clearance 15. Thus, the air can escape to the atmosphere only slowly.

As shown, the first valve member is in the form of a ball valve wherein it can be fully opened by movement of the handwheel 10 by rotation through 90° only. However, the invention is applicable to the use of other types of valve member where, for example, two or three turns of the handwheel 10 are required to open the valve fully.

The valve shown in the drawing is for a connection for a compressed air breathing apparatus wherein the valve outlet 3 satisfies standard EN144-2. However, other types of valve outlet and connectors can be used.

I claim:

1. A valve comprising:
   (i) a valve body;
   (ii) an inlet to receive fluid;
   (iii) an outlet to deliver fluid and adapted to receive a connector for conveying fluid from the outlet;
   (iv) a path within said valve body to enable fluid to pass from the inlet to the outlet;
   (v) a first valve member in the path and movable between a first position in which the first valve member closes the path and a second position in which the path is open;
   (vi) a safety mechanism in the form of a second valve member in the path and movable between a first position in which the second valve member reduces fluid flow along the path and second position in which the second valve member permits increased fluid flow along the path; and (vii) biasing means urging said second valve member into the first position;
   the second valve member including an abutment for engagement by said connector as said connector is received by said outlet to cause said second valve member to move from the first position in which the second valve member restricts fluid flow against the action of the biasing means to the second position.

2. A valve according to claim 1 wherein said first valve member is a ball valve.

3. A valve according to claim 1 wherein
   a first bore positioned within the valve body forms a portion of the path, located between the first and second valve members;
   said second valve member comprises a cylindrical sleeve having a tubular portion at one end defining a second bore in communication with an aperture in the cylindrical wall of the sleeve;
   wherein in said first position said first bore is not aligned with said aperture and in said second position said first bore and aperture are in registry with each other to allow fluid to flow from said first bore through said second bore.

4. A valve according to claim 3 wherein
   the valve body defines a third bore;
   said second valve member is slideably retained inside said third bore; and
   when said connector is received by said outlet, the second valve member is directly engaged by said connector and moved to the second position against the action of the biasing means.

5. A valve according to claim 4 wherein the biasing means includes a spring contained in said third bore.

6. A valve according to claim 4 wherein said third bore and said outlet are adapted such that when said connector is received by said outlet the bore accepts a protrusion on said connector which engages said second valve member to move the second valve member to the second position.

7. A valve according to claim 4 wherein a spigot is provided to locate said second valve member.

8. A valve according to claim 4 wherein there is a small clearance between the inside of said third bore and the outside of said second valve member to allow fluid to escape to the atmosphere slowly when said first valve member is in the second, open, position and said second valve member is in the first position in which the second valve member restricts fluid flow.

9. A valve comprising:
   (i) a valve body;
   (ii) an inlet to receive fluid;
   (iii) an outlet to deliver fluid and adapted to receive a connector for conveying fluid from the outlet;
   (iv) a path within said valve body to enable fluid to pass from the inlet to the outlet;
   (v) a first valve member in the path and movable between a first position in which the first valve member closes the path and a second position in which the path is open;
   (vi) a safety mechanism in the form of a second valve member in the path and movable between a first position in which the second valve member restricts fluid flow alone the path and second position in which the second valve member permits increased fluid flow along the path;
   (vii) biasing means urging said second valve member into the first position;
   (viii) a first bore positioned within the valve body and forming a portion of the path, located between the first and second valve members;
   said second valve member including an abutment for engagement by said connector as said connector is received by said outlet to cause said second valve member to move from the first position in which the second valve member restricts fluid flow against the action of the biasing means to the second position;
   said second valve member further comprising a cylindrical sleeve having a tubular portion at one end defining a second bore in communication with an aperture in the cylindrical wall of the sleeve;
   wherein in said first position said first bore is not aligned with said aperture and in said second position said first bore and aperture are in registry with each other to allow fluid to flow from said first bore through said second bore.

10. A valve according to claim 9 wherein
    the valve body defines a third bore;
    said second valve member is slideably retained inside said third bore; and
    when said connector is received by said outlet, the second valve member is directly engaged by said connector and moved to the second position against the action of the biasing means.

11. A valve according to claim 10 wherein the biasing means includes a spring contained in said third bore.

12. A valve according to claim 10 wherein said third bore and said outlet are adapted such that when said connector is received by said outlet the bore accepts a protrusion on said connector which engages said second valve member to move the second valve member to the second position.

13. A valve according to claim 10 wherein a spigot is provided to locate said second valve member.

14. A valve according to claim 10 wherein there is a small clearance between the inside of said third bore and the outside of said second valve member to allow fluid to escape to the atmosphere slowly when said first valve member is in the second, open, position and said second valve member is in the first position in which the second valve member restricts fluid flow.

15. A valve according to claim 8 wherein said first valve member is a ball valve.

* * * * *

UNITED STATES PATENT AND TRADEMARK OFFICE
CERTIFICATE OF CORRECTION

PATENT NO. : 5,762,105
DATED : June 9, 1998
INVENTOR(S) : Konstantin Röttger

It is certified that error appears in the above-identified patent and that said Letters Patent hereby corrected as shown below:

Column 4, line 32, change "alone" to --along--.

Signed and Sealed this

Twenty-ninth Day of September, 1998

Attest:

BRUCE LEHMAN

Attesting Officer     Commissioner of Patents and Trademarks